United States Patent
Suh et al.

(10) Patent No.: US 8,232,021 B2
(45) Date of Patent: Jul. 31, 2012

(54) STACK FOR FUEL CELL

(75) Inventors: Jun-Won Suh, Suwon-si (KR);
Young-Seung Na, Suwon-si (KR);
Keun-Yong Lee, Suwon-si (KR);
Sung-Won Jeong, Suwon-si (KR);
Chan-Gyun Shin, Suwon-si (KR);
Kyoung-Hwan Choi, Suwon-si (KR);
Sang-Kyun Kang, Seoul (KR)

(73) Assignee: Samsung SDI Co., Ltd., Yongin-si (KR)

( * ) Notice: Subject to any disclaimer, the term of this patent is extended or adjusted under 35 U.S.C. 154(b) by 586 days.

(21) Appl. No.: 12/054,242

(22) Filed: Mar. 24, 2008

(65) Prior Publication Data

US 2008/0299443 A1 Dec. 4, 2008

(30) Foreign Application Priority Data

May 28, 2007 (KR) .................. 10-2007-0051424

(51) Int. Cl.
*H01M 2/08* (2006.01)
*H01M 8/02* (2006.01)
(52) U.S. Cl. ......... 429/469; 429/508; 429/509; 429/514
(58) Field of Classification Search .................. 429/463, 429/514, 469, 508, 509, 510
See application file for complete search history.

(56) References Cited

U.S. PATENT DOCUMENTS

| | | | |
|---|---|---|---|
| 6,316,139 B1 * | 11/2001 | Uchida et al. | 429/469 X |
| 6,500,579 B1 | 12/2002 | Maeda et al. | |
| 6,524,735 B1 | 2/2003 | Wariishi et al. | |
| 6,869,719 B2 | 3/2005 | Hatoh et al. | |
| 7,544,219 B2 * | 6/2009 | Song et al. | 429/437 X |
| 7,572,539 B2 | 8/2009 | Kobayashi et al. | |
| 7,799,484 B2 * | 9/2010 | Kuroki et al. | 429/510 |
| 7,851,100 B2 | 12/2010 | Kobayashi et al. | |
| 7,919,212 B2 * | 4/2011 | Yagi et al. | 429/469 |
| 7,951,481 B2 | 5/2011 | Ishioka et al. | |

(Continued)

FOREIGN PATENT DOCUMENTS

EP 1 653 540 A1 5/2006

(Continued)

OTHER PUBLICATIONS

Extended European Search Report, for corresponding European Patent Application No. 08155041.0, dated Sep. 4, 2008, indicating the relevance of the listed references in this IDS.

(Continued)

*Primary Examiner* — Stephen J. Kalafut
(74) *Attorney, Agent, or Firm* — Christie, Parker & Hale, LLP (57) ABSTRACT

A fuel cell stack including an electricity generating unit for generating electrical energy by electrochemically reacting a fuel and an oxidizing agent, the electricity generating unit including: a first separator; a second separator; a membrane electrode assembly (MEA) between the first separator and the second separator, each of the first and second separators including a channel on a surface facing the MEA and a manifold in the surface facing the MEA, the manifold communicating with the channel; and a gasket, positioned at an outer circumference portion of an area where the MEA is positioned, for sealing a space between the first and second separators and for covering an open area of a channel extension area of at least one of the first and second separators where the manifold communicates with the channel.

12 Claims, 11 Drawing Sheets

U.S. PATENT DOCUMENTS

| | | | |
|---|---|---|---|
| 2002/0119359 A1* | 8/2002 | Yamazaki et al. | 429/32 |
| 2004/0048126 A1 | 3/2004 | Shibata et al. | |
| 2005/0003260 A1* | 1/2005 | Hatoh et al. | 429/35 |
| 2006/0127735 A1 | 6/2006 | Sabin et al. | |

FOREIGN PATENT DOCUMENTS

| | | | |
|---|---|---|---|
| JP | 9-97619 | * | 4/1997 |
| JP | 11-345620 | | 12/1999 |
| JP | 11-354134 | | 12/1999 |
| JP | 2000-182636 | | 6/2000 |
| JP | 2000-331691 | | 11/2000 |
| JP | 2001-057219 | | 2/2001 |
| JP | 2002-352817 | | 12/2002 |
| JP | 2003-077498 | | 3/2003 |
| JP | 2003-123799 | | 4/2003 |
| JP | 2004-200132 | | 7/2004 |
| JP | 2005-100970 | | 4/2005 |
| JP | 2006-024404 | | 1/2006 |
| JP | 2006-040792 | | 2/2006 |
| JP | 2006-202535 | | 8/2006 |
| KR | 10-2005-0020703 | | 3/2005 |
| KR | 10-0511160 | | 8/2005 |
| KR | 10-2006-008240 | | 7/2006 |
| WO | WO 03/092096 A2 | | 11/2003 |
| WO | WO 2006/040994 A1 | | 4/2006 |
| WO | WO 2006/075867 A1 | | 7/2006 |

OTHER PUBLICATIONS

Patent abstracts of Japan for publication No. 2004-200132 dated Jul. 15, 2004 in the name of Motoharu Obika, et al.

Korean patent abstracts for publication No. 1020050020703 dated Mar. 4, 2005 in the name of Teruhisa Kanbara, et al.

Korean patent abstracts for publication No. 1020060082406 dated Jul. 18, 2006 in the name of Seong Min Song, et al.

Japanese Office action dated May 10, 2011, for corresponding Japanese Patent application 2007-288764, noting listed references in this IDS, 3 pages.

Patent Abstracts of Japan, and English machine translation of Japanese Publication 11-354134, listed above 16 pages, (Dec. 1999).

Patent Abstracts of Japan, and English machine translation of Japanese Publication 2000-182636, listed above 26 pages, (Jun. 2000).

Patent Abstracts of Japan, and English machine translation of Japanese Publication 2002-352817 listed above 8 pages, (Jun. 2002).

Patent Abstracts of Japan, and English machine translation of Japanese Publication 2003-077498 listed above 14 pages, (Mar. 2003).

Patent Abstracts of Japan, and English machine translation of Japanese Publication 2003-123799 listed above 11 pages, (Apr. 2003).

Patent Abstracts of Japan, and English machine translation of Japanese Publication 2006-024404 listed above 13 pages, (Jan. 2006).

Patent Abstracts of Japan, and English machine translation of Japanese Publication 2006-202535 listed above 28 pages, (Mar. 2006).

Japanese Office action dated May 1, 2012, for corresponding Japanese Patent application 2007-288764, (2 pages).

Patent Abstracts of Japan, and English machine translation of Japanese Publication 2003-077498, listed above, (10 pages).

* cited by examiner

RELATED ART

FIG. 11

RELATED ART

FIG. 12

RELATED ART

STACK FOR FUEL CELL

CROSS-REFERENCE TO RELATED APPLICATION

This application claims priority to and the benefit of Korean Patent Application No. 10-2007-0051424, filed in the Korean Intellectual Property Office on May 28, 2007, the entire content of which is incorporated herein by reference.

BACKGROUND OF THE INVENTION

1. Field of the Invention

The present invention relates to a fuel cell stack for generating electricity by an electrochemical reaction of a fuel and an oxidizing agent. More particularly, the present invention relates to a fuel cell stack including an improved gasket mounted in an electricity generating unit to maintain a substantially air-tight seal.

2. Description of the Related Art

A fuel cell is a device for generating electrical energy by an oxidation reaction of a fuel and a reduction reaction of an oxidizing gas. The fuel cell may be classified as a polymer electrolyte membrane fuel cell or a direct oxidation fuel cell, according to a type of fuel.

In the polymer electrolyte membrane fuel cell, a modified gas from a liquid or gas fuel and an oxidizing gas are received, and electrical energy is generated by an oxidation reaction of the modified gas and a reduction reaction of the oxidizing gas. The polymer electrolyte membrane fuel cell has excellent output performance, a low operational temperature, and quick start and response characteristics. Therefore, the polymer electrolyte membrane fuel cell is widely used as a mobile power source for vehicles, a distributed power source for buildings, and a small power source for electrical devices.

The direct oxidation fuel cell receives liquid fuel and air to generate electrical energy by an oxidation reaction of the fuel and a reduction reaction of the oxidizing gas.

The fuel cell includes an electricity generating unit that is a unit cell for generating electrical energy. The electricity generating unit includes a membrane electrode assembly (MEA), a pair of separators (with the MEA between the pair of separators), and a gasket that is provided at an edge of the MEA and allows the space between the pair of separators to be air-tight. Multiple electricity generating units are sequentially arranged to form one stack.

One of the separators includes a channel for supplying the fuel to a surface facing the MEA, and a manifold penetrating through the separator. The manifold communicates with the channel so that the fuel is provided to the channel through the manifold. However, in the fuel cell stack according to the prior art, a membrane of the MEA expands at a boundary area of the manifold and the channel, and therefore the membrane problematically blocks the channel.

Figure 10:
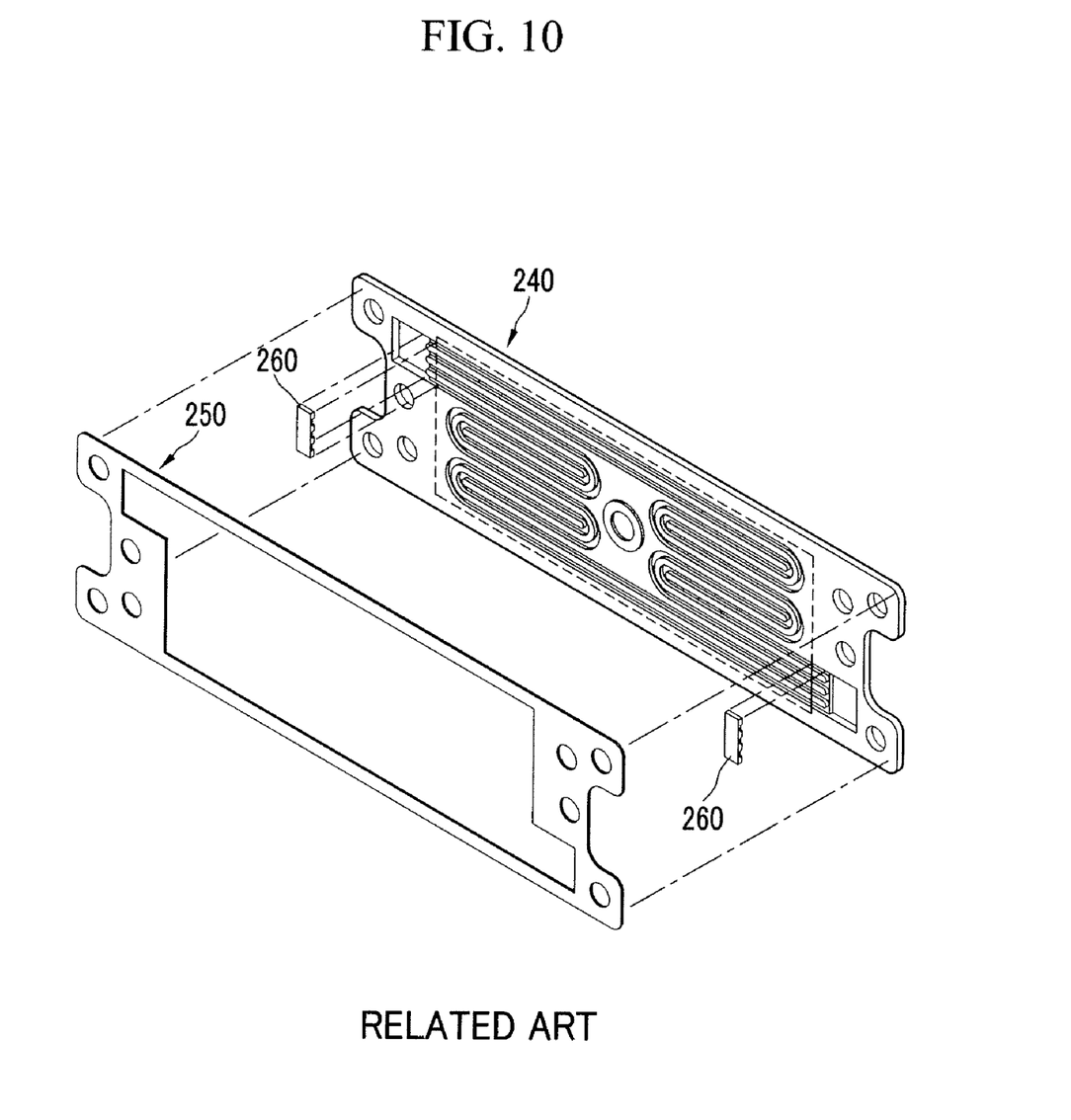
FIG. 10 is an exploded perspective schematic view of an anode separating plate and a gasket according to the prior art.
Figure 11:
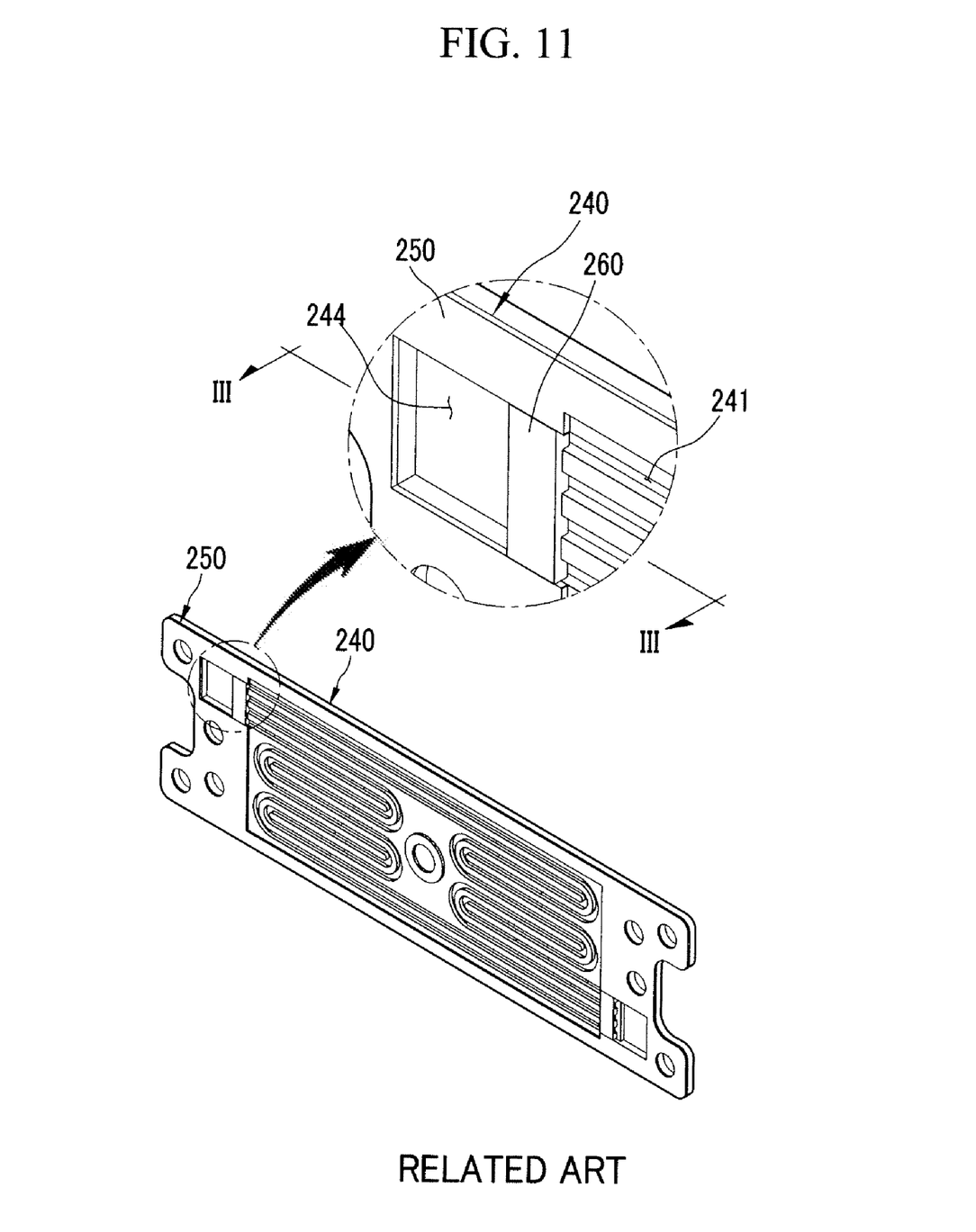
FIG. 11 is a combined perspective schematic view of the anode separating plate and the gasket shown in FIG. 10.
Figure 12:
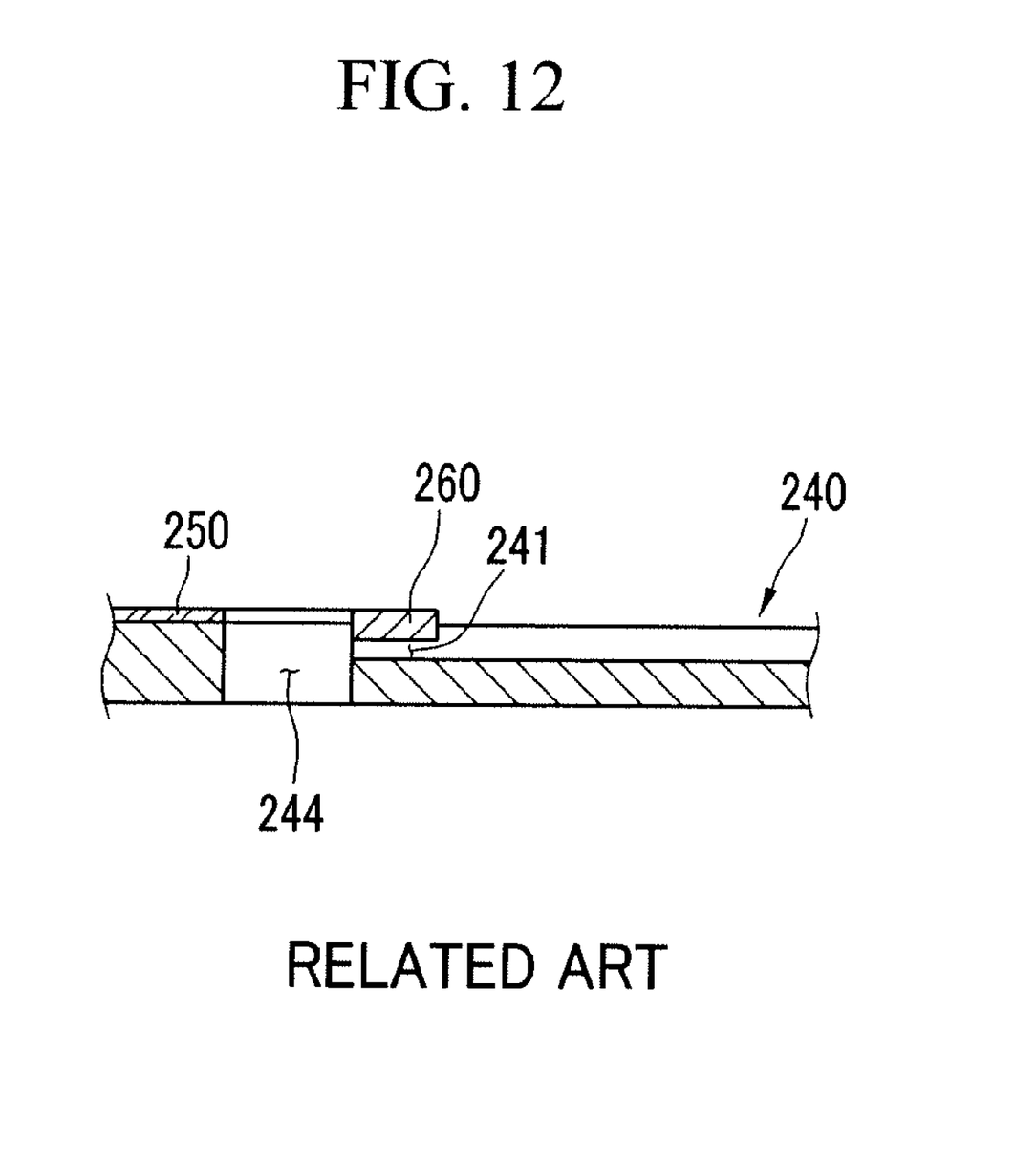
FIG. 12 is a cross-sectional schematic view along the line III-III shown in FIG. 11.

Therefore, in the fuel cell stack according to the prior art, as shown in FIG. 10 to FIG. 12, a bridge 260 is additionally provided at the boundary area of the channel 241 and the manifold 244 so as to solve the problem of the membrane blocking the channel 241. That is, the bridge 260 prevents (or blocks) the membrane from expanding, and provides a path from the manifold 244 to the channel 241.

However, since the bridge 260 is additionally provided in the fuel cell stack according to the prior art, an additional cost occurs, and thickness of the separator 240 and the gasket 250 is problematically increased by the height of the bridge 260.

The above information disclosed in this Background section is only for enhancement of understanding of the background of the invention and therefore it may contain information that does not form the prior art that is already known in this country to a person of ordinary skill in the art.

SUMMARY OF THE INVENTION

An aspect of an embodiment of the present invention is directed toward a fuel cell stack with an improved shape of a gasket to prevent (protect) a membrane from expanding to a space between a manifold and a channel.

An embodiment of the present invention provides a fuel cell stack including an electricity generating unit for generating electrical energy by electrochemically reacting a fuel and an oxidizing agent, the electricity generating unit including: a first separator; a second separator; a membrane electrode assembly (MEA) between the first separator and the second separator, each of the first and second separators including a channel on a surface facing the MEA and a manifold in the surface facing the MEA, the manifold communicating with the channel; and a gasket, positioned at an outer circumference portion of an area where the MEA is positioned, for sealing a space between the first and second separators and for covering an open area of a channel extension area of at least one of the first and second separators where the manifold communicates with the channel.

The gasket may include two or more layers including materials with different hardness levels.

The gasket may include a hard material layer having a high hardness level, and a soft material layer having a low hardness level.

BRIEF DESCRIPTION OF THE DRAWINGS

The accompanying drawings, together with the specification, illustrate exemplary embodiments of the present invention, and, together with the description, serve to explain the principles of the present invention.

FIG. 9(*a*), FIG. 9(*b*), and FIG. 9(*c*) are cross-sectional schematic views, according to embodiments of the present invention, of the gasket shown in FIG. 5.

DETAILED DESCRIPTION

In the following detailed description, only certain exemplary embodiments of the present invention have been shown and described, simply by way of illustration. As those skilled in the art would realize, the described embodiments may be modified in various different ways, all without departing from the spirit and scope of the present invention. Accordingly, the drawings and description are to be regarded as illustrative in nature and not restrictive. Like reference numerals designate like elements throughout the specification.

Figure 1:
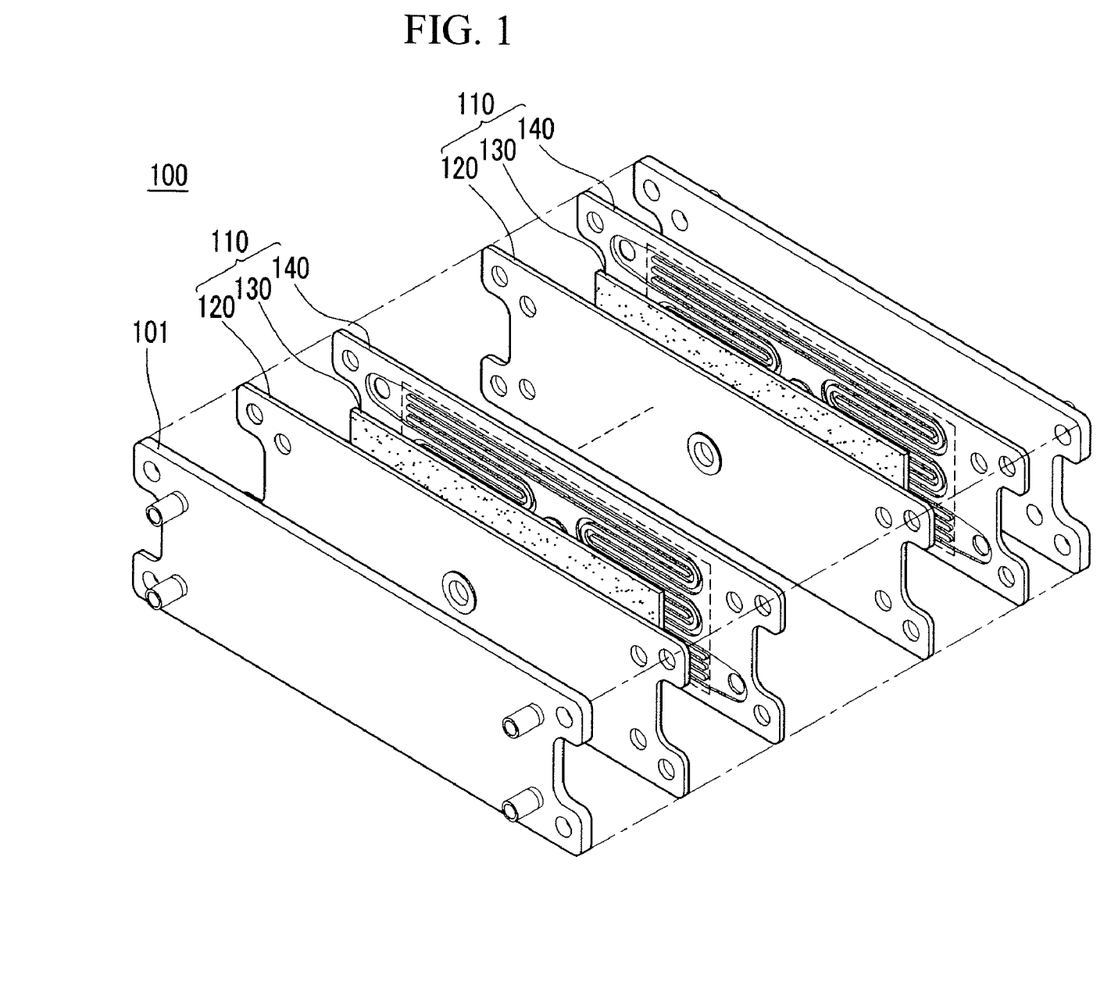
FIG. 1 is a perspective schematic view of a fuel cell stack according to an exemplary embodiment of the present invention.

FIG. 1 is a perspective schematic view of a fuel cell stack according to an exemplary embodiment of the present invention.

As shown in FIG. 1, the fuel cell stack 100 receives a fuel and an oxidizing agent, and includes at least one electricity generating unit 110 for generating electrical energy by an oxidation reaction of the fuel and a reduction reaction of the oxidizing agent. Here, generally, an alcohol fuel, such as methanol or ethanol, is used as the fuel, and air is used as the oxidizing agent. The electricity generating unit 110 is a minimum unit for generating electricity, which is also referred to as a "unit cell". The fuel cell stack 100 includes a set of sequentially arranged electricity generating units 110 and further includes an end plate 101 provided to an end side of the set.

The electricity generating unit 110 includes a membrane electrode assembly (MEA) 130, and separators 120 and 140 respectively disposed at both sides of the MEA 130. The MEA 130 includes a cathode and an anode respectively provided at both sides of a membrane. The anode oxidizes the fuel to separate it into electrons and protons. In addition, the membrane transmits the protons to the cathode, and the cathode reduces the protons with the oxidizing gas (or oxidizing agent).

The separators 120 and 140 are formed in a substantially plate shape. The first separator 120, as a cathode separating plate, includes a channel on one surface facing the cathode of the MEA 130. The second separator 140, as an anode separating plate, includes a channel on one surface facing the anode of the MEA 130. Since the first separator 120 and the second separator 140 are formed in substantially the same shape, only the second separator 140 will be described in more detail.

Figure 2:
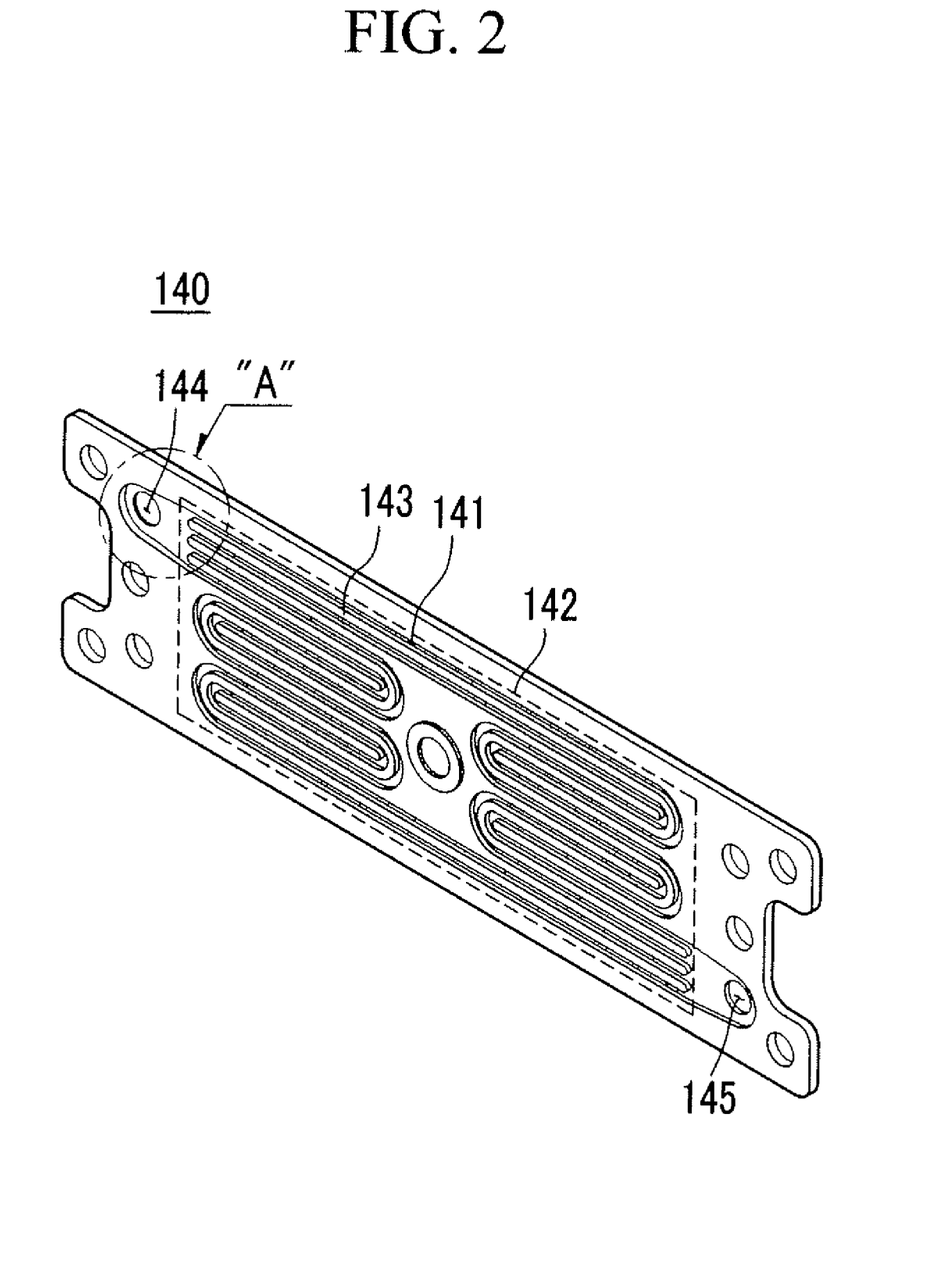
FIG. 2 is a perspective schematic view of the second separator, shown in FIG. 1, as an anode separating plate.

FIG. 2 is a perspective schematic view of the second separator 140, as the anode separating plate, shown in FIG. 1.

As shown in FIG. 1 and FIG. 2, the separator 140 according to the exemplary embodiment of the present invention includes a channel 141 on one surface thereof, and the fuel flows along the channel 141. An area forming the channel 141 is a dotted line area 142 in FIG. 2, and the dotted line area 142 faces the MEA 130, as shown in FIG. 1. The channel 141 is divided into several sections (or parts) by a barrier rib 143. Here, the channel 141 may be divided into multiple sections (or an even number of parts) by the barrier rib 143. That is, even though the channel is divided (e.g., into two channels), the sections of the channel 141 (or areas of the channel 141) in the dotted line area 142 in FIG. 2 may be symmetrical to each other.

Manifolds 144 and 145 penetrate through the separator 140 near ends of the area forming the channel 141. Since a plurality of separators 120 and 140 are combined to form the fuel cell stack 100, the manifolds 144 and 145 each form one path. A plurality of manifolds 144 and 145 may be formed in one separator 140. In an embodiment of the present invention, the first manifold 144 is for receiving the fuel and the second manifold 145 is for outputting the fuel that is not reacted.

Figure 3:
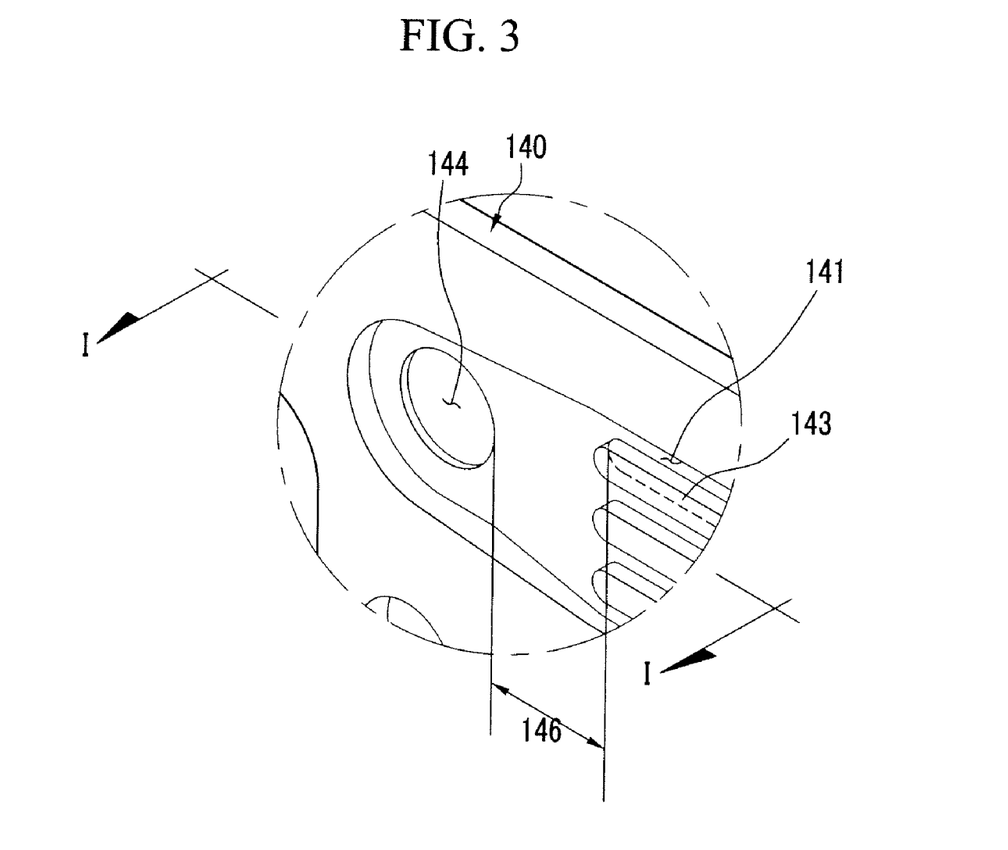
FIG. 3 is an expanded schematic view of an area A shown in FIG. 2.

FIG. 3 is an expanded schematic view of the area A shown in FIG. 2.

As shown in FIG. 2 and FIG. 3, the channel 141 communicates with the manifolds 144 and 145, and the areas where the channel 141 communicates with the manifolds 144 and 145 are referred to as channel extension areas 146, in an embodiment of the present invention. The channel extension areas 146 are respectively formed at an inlet of the channel 141 to which the fuel is provided and at an outlet of the channel 141 that outputs the remaining fuel.

Figure 4:
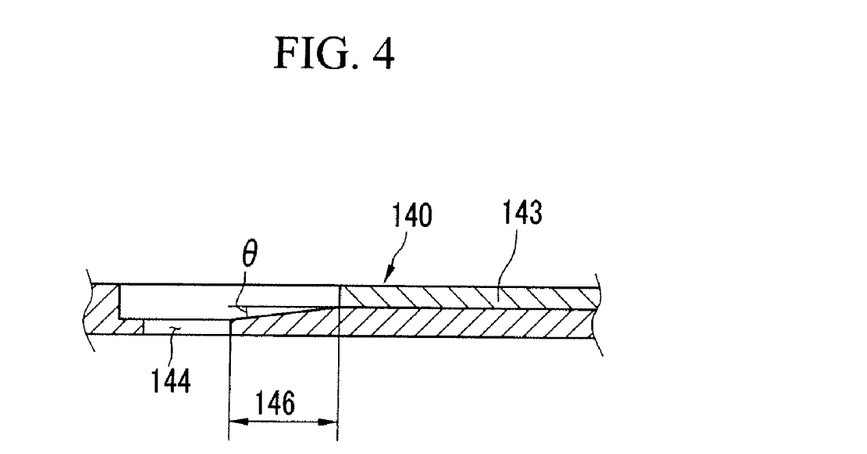
FIG. 4 is a cross-sectional schematic view along the line I-I shown in FIG. 3.

FIG. 4 is a cross-sectional schematic view along the line I-I shown in FIG. 3.

As shown in FIG. 4, a bottom surface of the channel extension area 146 is inclined, and so the open area (or space) cross-section of the channel extension area 146 is reduced from the manifold 144 to the channel 141.

Figure 5:
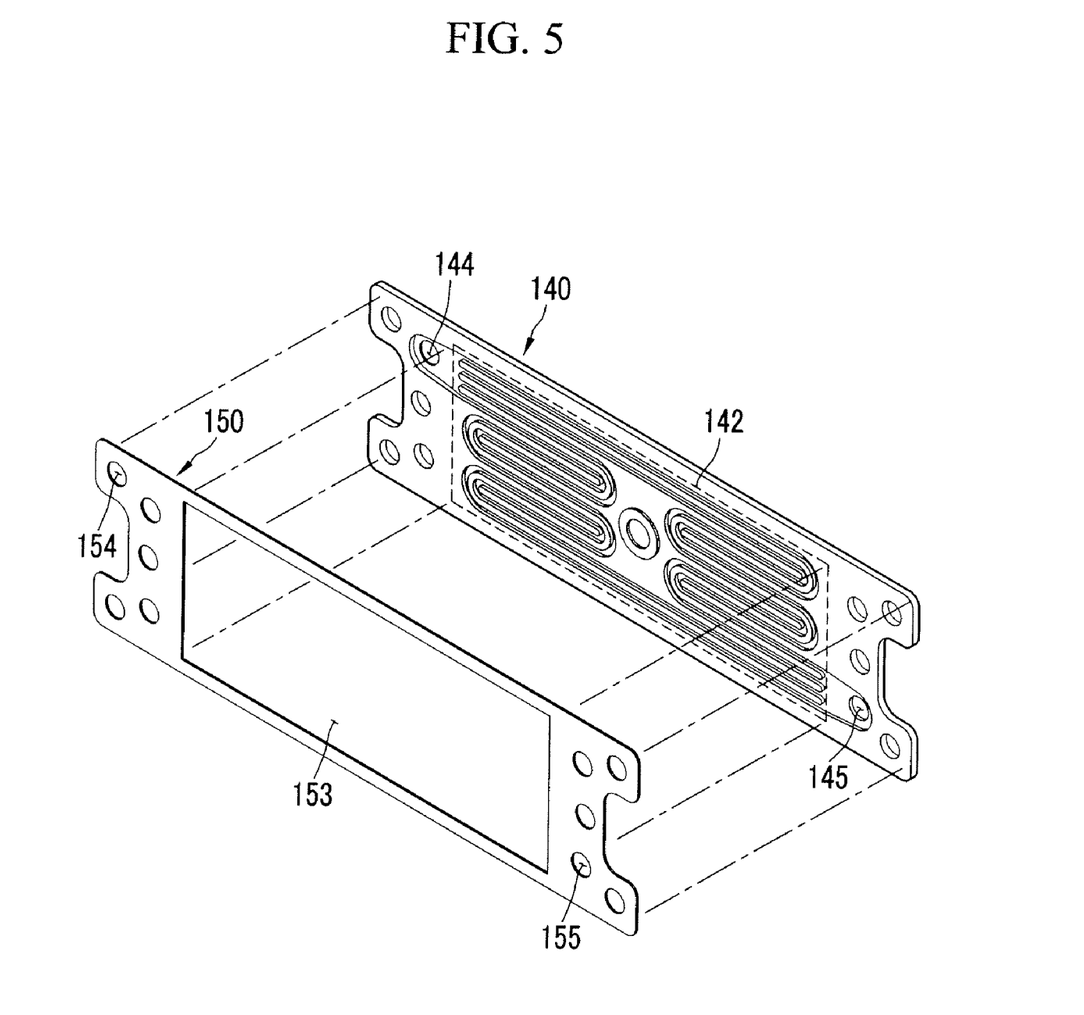
FIG. 5 is an exploded perspective schematic view of the anode separating plate and the gasket shown in FIG. 1.
Figure 6:
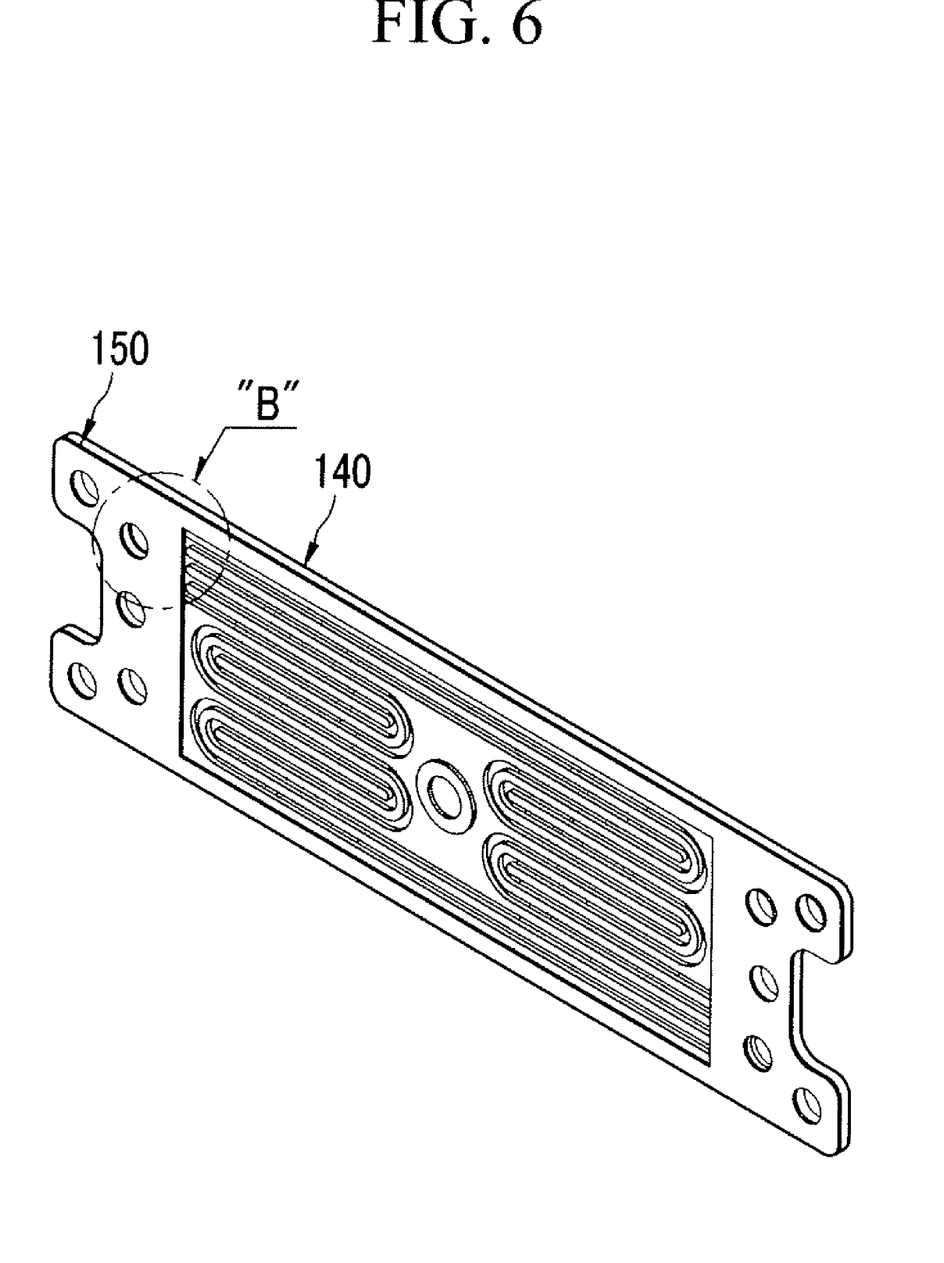
FIG. 6 is a combined perspective schematic view of the anode separating plate and the gasket shown in FIG. 5.

FIG. 5 is an exploded perspective schematic view of the anode separating plate 140 and a gasket 150 shown in FIG. 1, and FIG. 6 is a combined perspective schematic view of the anode separating plate 140 and the gasket 150 shown in FIG. 5.

As shown in FIG. 5 and FIG. 6, according to an embodiment of the present invention, a gasket 150 for sealing a space between the pair of separators 120 and 140 at each side of the MEA 130 is further provided to an outer circumference portion of an area where the MEA 130 is positioned.

The gasket 150 is formed in a substantially plate shape that may be closely positioned to the separator 140, and first penetration holes (or through holes) 154 and 155 corresponding to the manifolds 144 and 145, respectively, of the separator 140 are formed therein. In addition, the gasket 150 includes a second penetration hole 153 having a planar area substantially corresponding to the dotted line area 142 in FIG. 2 and to the MEA 130.

Figure 7:
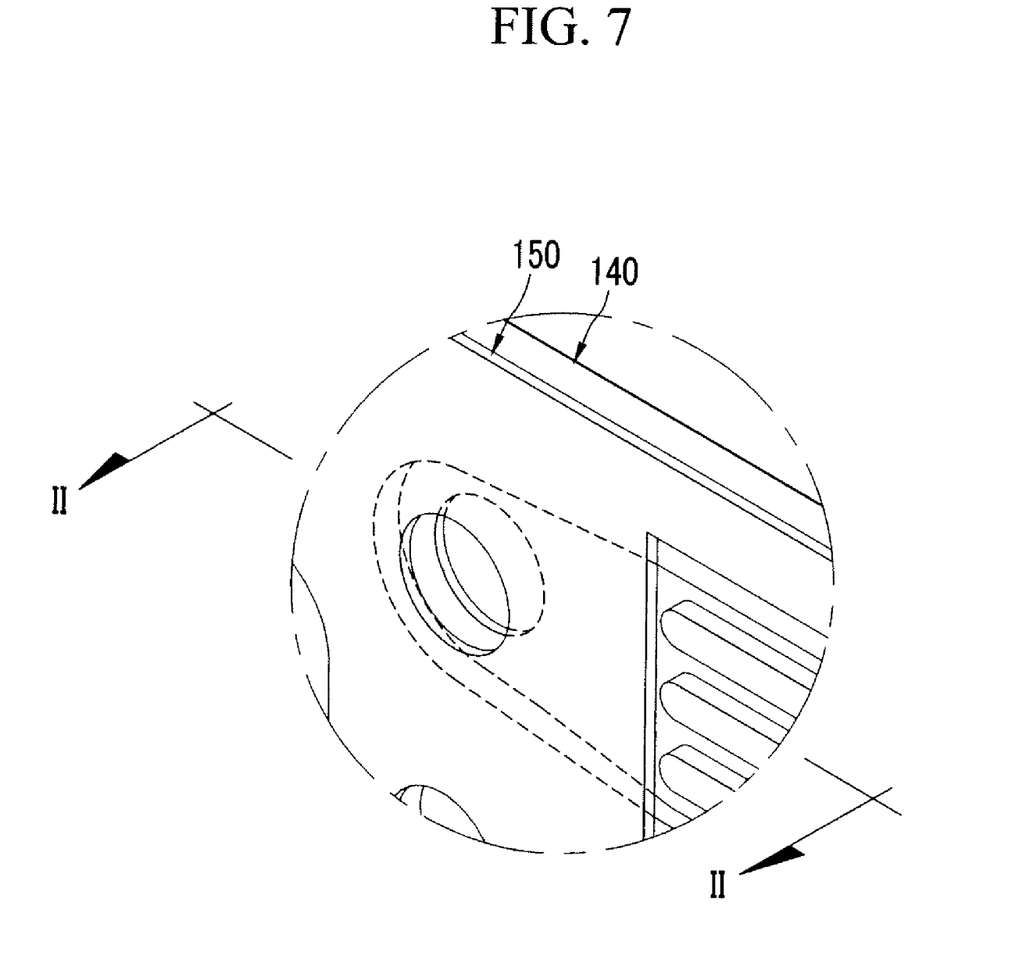
FIG. 7 is an expanded schematic view of an area B shown in FIG. 6.
Figure 8:
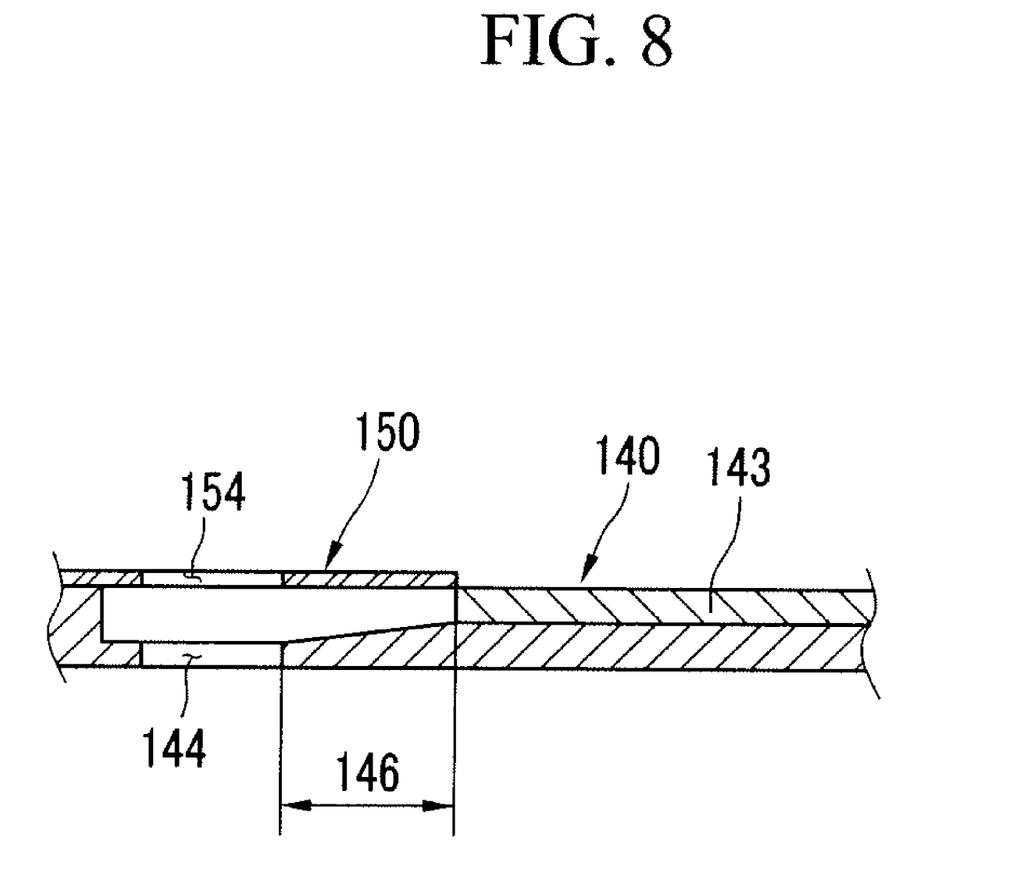
FIG. 8 is a cross-sectional schematic view along the line II-II shown in FIG. 7.

FIG. 7 is an expanded schematic view of an area B shown in FIG. 6, and FIG. 8 is a cross-sectional schematic view along the line II-II shown in FIG. 7.

As shown in FIG. 7 and FIG. 8, the gasket 150 is over (or covers) the periphery area of the manifold 144. That is, the gasket 150, according to an embodiment of the present invention, is positioned on the channel extension area 146 of the separator 140 to cover an opened area of the channel extension area 146.

In the fuel cell stack 100, according to an embodiment of the present invention, a plurality of electricity generating units 110 are combined, and the MEAs 130 are positioned in the second penetration holes 153 of the gaskets 150 (or are positioned in areas defined by the second penetration holes 153). The fuel is input or output through the manifolds 144 and 145.

The membrane of the MEA 130 absorbs moisture from the fuel. Thereby, the membrane of the MEA 130 can expand so that it may block the inlet or the outlet of the channel 141. However, according to an embodiment of the present invention, since the gasket 150 covers the channel extension area 146 of the separator 140, the membrane of the MEA 130 may not expand (or may be blocked from expanding) into this area.

In addition, the fuel cell stack may further include a bridge on the channel extension area 146 to prevent (or block) the membrane of the MEA from expanding and allow the fuel to flow. However, in an embodiment of the present invention, since a bottom area of the channel extension area 146 is inclined, a depth (or thickness) of the channel extension area 146 is small (or thin) near the outlet or inlet of the channel 141. Further, since the gasket 150 is over (or covers) the opened area of the channel extension area 146 and the periphery area of the manifolds 144 and 145, a bridge that may add pressure on the channel extension area 146 is not additionally provided in the present embodiment of the present invention. In addition, the gasket 150 has compressible characteristics to seal the space between the separators 120 and 140, and has the following configuration, according to an embodiment of the present invention.

Figure 9A:
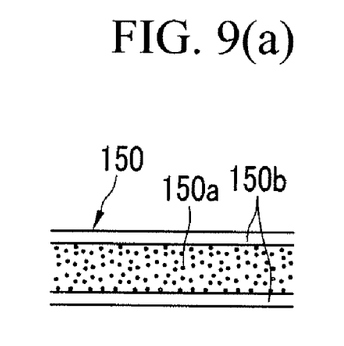
Figure 9B:
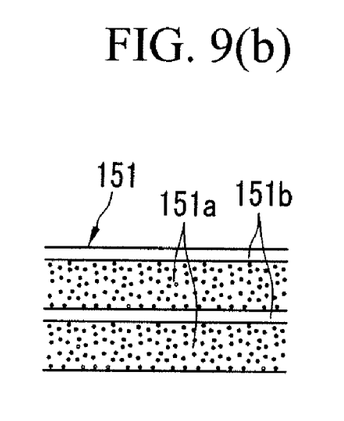
Figure 9C:
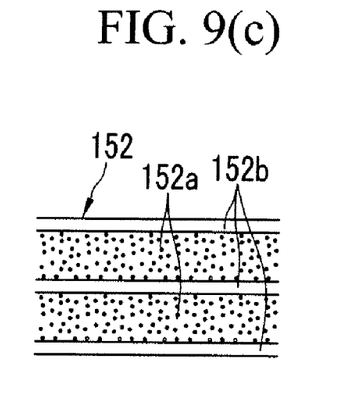

FIG. 9(a) to FIG. 9(c) are cross-sectional schematic views, according to embodiments of the present invention, of the gasket shown in FIG. 5.

As shown in FIG. 9(a), the gasket 150, according to an embodiment of the present invention, includes two or more layers respectively formed of materials with different hardness levels. That is, the gasket 150 includes a hard material layer 150a having a high hardness level, and soft material layers 150b having a low hardness level. The hard material layer 150a has a thickness (e.g., a predetermined thickness) and a low compressibility. The soft material layers 150b have a high compressibility (e.g., a predetermined compressibility) so as to be compressed by the separators 120 and 140 by a fastening force. The hard material layer 150a is positioned between the soft material layers 150b. The soft material layers 150b are attached to the separators 120 and 140 in a compressing process.

The hard material layer 150a may include metal, polyethylene terephthalate (PET), and polyethylene naphthelate (PEN) materials. The soft material layers 150b may include Teflon, polytetrafluoro ethylene (PTFE), and ethylene propylene rubber (EPDM) materials.

As shown in FIG. 9(b), hard material layers 151a and soft material layers 151b are alternately combined to form a gasket 151, according to another embodiment of the present invention. In this case, when a hard material layer 151a is positioned as an outer (or exposed) surface of the gasket 151, an adhesive is coated on an outer (or exposed) surface of the hard material layer 151a so that the hard material layer 151a may be attached to the separators 120 and 140.

As shown in FIG. 9(c), hard material layers 152a and soft material layers 152b may be alternately combined to form a gasket 152, according to a further embodiment of the present invention.

As described above, according to an embodiment of the present invention, since the gasket covers the opened area of the channel extension area where the manifold communicates with the channel in the fuel cell stack, the fuel may stably flow while preventing (or blocking) the membrane of the MEA from expanding.

In addition, the thickness of the stack, according to an embodiment of the present invention, may be reduced to be thinner than the stack according to the prior art in which the bridge is provided to the channel extension area to allow the fuel to flow.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A fuel cell stack comprising an electricity generating unit for generating electrical energy by electrochemically reacting a fuel and an oxidizing agent, the electricity generating unit comprising:
a first separator;
a second separator;
a membrane electrode assembly (MEA) between the first separator and the second separator, each of the first and second separators comprising a channel on a surface facing the MEA, the channel being divided into a plurality of sections by a barrier rib, and a manifold in the surface facing the MEA, the manifold communicating with the channel; and
a gasket, positioned at an outer circumference portion of an area where the MEA is positioned, for sealing a space between the first and second separators and for covering an open area of a channel extension area of at least one of the first and second separators where the manifold communicates with the channel, the channel extension area having a single inclined surface extending from an edge of the manifold to an edge of the barrier rib, the gasket being a separable piece from the MEA and having substantially flat sides respectively facing the first separator and the second separator,
wherein the gasket comprises a hard material layer and a plurality of soft material layers, the hard material layer having a higher hardness level than that of the soft material layers, and
the soft material layers are respectively on opposite sides of the hard material layer, the soft material layers being thinner than the hard material layer.

2. The fuel cell stack of claim 1, wherein the gasket has substantially a plate shape so as to be closely attached to the separator.

3. The fuel cell stack of claim 2, wherein the gasket comprises a first penetration hole corresponding to the manifold.

4. The fuel cell stack of claim 3, wherein the gasket comprises a second penetration hole having a planar area corresponding to the MEA.

5. The fuel cell stack of claim 1, wherein the at least one of the first and second separators is an anode separating plate in which the fuel is input through the channel of the at least one of the first and second separators.

6. The fuel cell stack of claim 5, wherein the channel extension area comprises a first channel extension area at an inlet of the channel where the fuel is input and a second channel extension area at an outlet of the channel where remaining fuel is output.

7. The fuel cell stack of claim 1, wherein an open area cross-section of the channel extension area is reduced from the manifold to the channel.

8. The fuel cell stack of claim 1, wherein the channel is divided into an even number of symmetrical sections.

9. The fuel cell stack of claim 1, wherein one of the soft material layers is positioned as an outermost layer of the gasket to be attached to the at least one of the first and second separators.

10. The fuel cell stack of claim 1,
wherein the gasket further comprises a second hard material layer on one of the soft material layers, and
wherein the second hard material layer is positioned as an outermost layer of the gasket, and an adhesive is coated on an outer surface of the second hard material layer to attach the gasket to one of the at least one of the first and second separators.

11. The fuel cell stack of claim 1, wherein the hard material layer comprises metal, polyethylene terephthalate (PET), and/or polyethylene naphthelate (PEN) materials.

12. The fuel cell stack of claim 11, wherein the soft material layer comprises polytetrafluoro ethylene (PTFE) and/or ethylene propylene rubber (EPDM) materials.

* * * * *

UNITED STATES PATENT AND TRADEMARK OFFICE
CERTIFICATE OF CORRECTION

| | | |
|---|---|---|
| PATENT NO. | : 8,232,021 B2 | Page 1 of 1 |
| APPLICATION NO. | : 12/054242 | |
| DATED | : July 31, 2012 | |
| INVENTOR(S) | : Jun-Won Suh et al. | |

It is certified that error appears in the above-identified patent and that said Letters Patent is hereby corrected as shown below:

On the Title Page item (56) References Cited, page 2, FOREIGN PATENT DOCUMENTS, line 17

Delete "KR 10-2006-008240 7/2006"
Insert -- KR 10-2006-0082406 7/2006 --

Signed and Sealed this
Fourth Day of March, 2014

Michelle K. Lee
*Deputy Director of the United States Patent and Trademark Office*